June 16, 1959
C. S. BENEFIELD
2,890,936
METHOD FOR PRODUCING PHOSPHORIC ACID
Filed Feb. 1, 1956
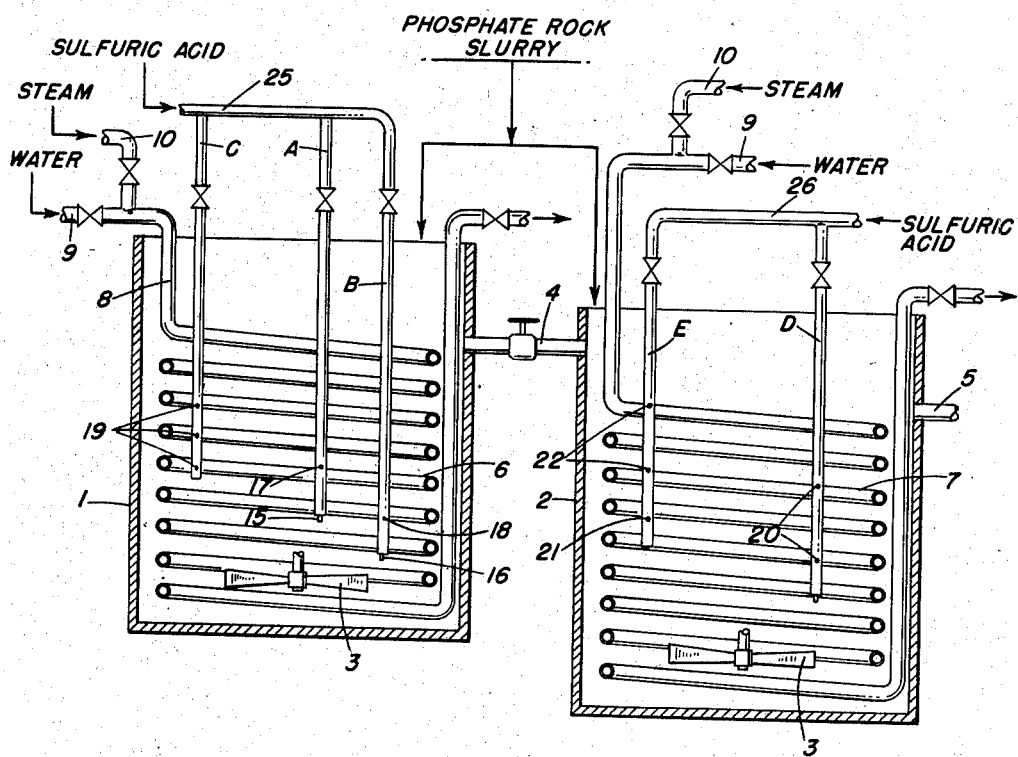
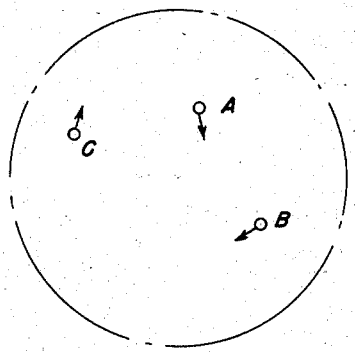
DIGESTER 1.
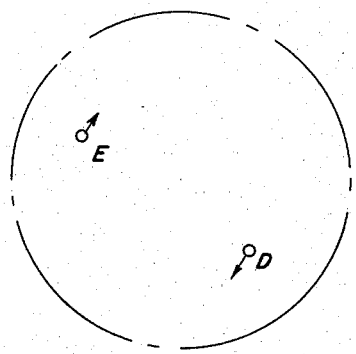
DIGESTER 2.
INVENTOR.
CURT S. BENEFIELD
BY
*Wm. P. Spielman*
ATTORNEY.

2,890,936
METHOD FOR PRODUCING PHOSPHORIC ACID

Curt S. Benefield, Roselle, N.J.

Application February 1, 1956, Serial No. 562,728

2 Claims. (Cl. 23—165)

This invention relates to a method and apparatus for the digestion of ground phosphate rock with aqueous sulfuric acid for phosphoric acid production. The invention is particularly adapted for use in the production of phosphoric acid from which triple superphosphate fertilizer is manufactured, but it will be understood that the principles thereof can be applied to similar digestion processes for other purposes.

The sulfuric acid digestion of phosphate rock is ordinarily carried out by agitating a slurry of the ground rock with aqueous sulfuric acid in one or more reaction vessels known as digesters. Usually several of these digesters are arranged in cascade with the digestion mixture flowing from one to the other in series until substantially all of the phosphoric acid values have been extracted from the rock; the resulting slurry of calcium sulfate in aqueous phosphoric acid is then treated by settling or filtration, or both, for removal of the suspended calcium sulfate crystals. The finely divided phosphate rock is slurried in water or dilute aqueous phosphoric acid and introduced into the first or the first and second digesters of the series and the sulfuric acid is usually added as a single stream to each of these digesters and mixed with the ground rock slurry by stirring. In order to minimize localized acid overconcentrations the sulfuric acid is usually diluted to about 40–60% $H_2SO_4$ content before it is fed into the digesters.

The rate at which the digestion reaction proceeds depends largely on the reaction temperature and on the concentration of free sulfuric acid in the digestion mixture. These factors are, however, subject to definite limitations; if the digestion temperature is too high and easily filterable calcium sulfate is difficult to obtain. When the concentration of free sulfuric acid is too high the recovery of $P_2O_5$ values from the rock is incomplete, as there is a tendency for the rock granules to become coated with a layer of insoluble calcium sulfate which interferes with further reaction.

It is a principal object of the present invention to provide a procedure for digesting phosphate rock wherein a uniform and relatively fast reaction rate are combined with a high degree of extraction efficiency. A further object is the provision of a digestion method wherein strong sulfuric acid of about 75–95% $H_2SO_4$ content can be introduced directly into the digestion mixture, thus avoiding the difficulties attendant upon prior dilution of sulfuric acid of commercial strength. A still further object is the provision of an effective apparatus and method for controlling the temperature of the digestion mixture by means of cooling elements immersed therein and for removing gypsum scale from such cooling elements without the necessity of interrupting the digestion reaction.

As is indicated above, the digestion mixture in the phosphate rock digesters is a thick slurry, usually having a solids content on the order of about 26–38%. I have found that under ordinary operating conditions, wherein a large body of the slurry is agitated and sulfuric acid is added as a single stream, the concentration of acid in different portions of the slurry is not uniform; in some parts the acid concentration is likely to be too low, with a corresponding reduction in the reaction rate, while in other portions there may be too much acid with attendant losses in yield. This condition exists even when the acid used is relatively dilute, and of course would be aggravated still further if a more concentrated acid were used. I have devised an improved method and apparatus wherein a highly uniform distribution of sulfuric acid is maintained throughout the entire body of digestion mixture, and have obtained a number of important practical advantages by the operation thereof.

The principal feature of my invention is based on the discovery that the reaction rate within a large body of digestion mixture containing ground phosphate rock and aqueous sulfuric acid can be substantially improved by a more uniform distribution of added sulfuric acid throughout the mixture than has heretofore been obtained. I have also found that injection of sulfuric acid into the mixture at a number of spaced points will improve the recovery of phosphoric acid values from the rock and will permit the use of a more coarsely ground rock feed than has previously been economical.

By dividing the injected sulfuric acid into a number of smaller streams an acid of higher strength can also be used, avoiding the necessity of diluting the commercial grades of sulfuric acid with water or weak phosphoric acid, as has heretofore been the practice. The use of strong sulfuric acid is also of importance in that it permits a more extensive washing of the calcium sulfate filter cake, thereby improving the phosphoric acid recoveries, without materially decreasing the strength of the product acid.

Considerable heat is generated by the reaction of sulfuric acid with phosphate rock, and this is augmented by the additional heat of dilution when strong sulfuric acid is used. Positive cooling of the digestion mixture is therefore necessary in large-scale commercial operations. One of the most economical cooling methods is by passing a stream of cooling fluid such as cool water through cooling coils immersed in a liquid; however, this procedure is not regarded as feasible in the sulfuric acid digestion of phosphate rock because the coils quickly become coated with a layer of gypsum scale. This reduces the rate of heat transfer to the cooling water and if operation is continued the scale formation increases to the point where the cooling coils are unable to remove the heat generated by the reaction. During the time when scale is forming on the coils it is necessary to reduce the rate of acid and phosphate rock addition to avoid excessive temperature rise, and finally operations must be discontinued entirely for the time required to empty out the digesters and mechanically remove the hard scale from the coils. In accordance with a second important feature of my invention continuous and substantially uniform operation is obtained by removing the gypsum from the coils while the digestion reaction is in progress; I have found that this can be done by heating the coils to temperatures above those of the digestion mixture and thereby cracking off the scale promptly and cleanly. This can readily be accomplished by shutting off the cooling water and admitting steam under pressure to the cooling coils.

The invention will be further described with reference to the accompanying drawing wherein Fig. 1 is a diagrammatic illustration of two digesters embodying the features of the invention and Fig. 2 is a diagrammatic plan showing the locations of the acid-distributing probes therein.

On the drawing two digestion tanks operating in series are indicated by reference numerals 1 and 2, respectively.

Each of these digesters is a large cylindrical tank of acid-proof construction provided with an agitator 3 for maintaining particles of ground phosphate rock in suspension in an acid digestion liquid therein. The two digesters are connected by a valved pipe 4 and a similar pipe 5 leads to the next digester in the series or to a settling tank or filter. The digesters are equipped with cooling coils 6 and 7, which are preferably located adjacent their side walls as shown and below the liquid levels therein. The inlet end 8 of the coil 6 is connected to a valved water inlet pipe 9 and a valved steam inlet pipe 10, so that either water or steam or a mixture thereof can be passed through the coil, and similar connections to the coil 7 are indicated by the same reference numerals.

As is indicated above, the injection of sulfuric acid into the suspension of phosphate rock particles undergoing digestion as a plurality of separate streams is an important feature of the invention. In order to maintain a substantially uniform distribution of sulfuric acid throughout the body of digestion mixture in the first digester three injection pipes or probes designated as A, B and C are provided. These probes extend into the digestion tank to different depths and are provided with openings or nozzles designed and located in such a manner that incoming sulfuric acid is distributed uniformly throughout the reaction mixture. In the installation shown, probes A and B have bottom openings 15 and 16 which are $\frac{1}{4}''$ in diameter; probe A has a single $\frac{3}{16}''$ side opening 17 and probe B has a single $\frac{1}{4}''$ side opening 18. Probe C, which injects acid into the upper part of the digester, is closed at its end but has three $\frac{1}{4}''$ openings 19 in its side wall. The location of the three probes with respect to the side walls of the digester 1 is shown in Fig. 2 and the true direction of the side openings is indicated in this figure by the arrows. In this respect the showing in Fig. 1 is diagrammatic, inasmuch as all the side openings in that figure are shown in full view for purposes of illustration. It will also be noted from Fig. 2 that the probes B and D actually are located in front of the section line on which Fig. 1 is taken.

The digester 2 is shown as containing only two acid injection pipes or probes D and E, inasmuch as a considerably smaller quantity of sulfuric acid (usually about 20% of the total amount) is added to the process in this digester. The probe D has a $\frac{1}{4}''$ end opening in the installation shown and contains two $\frac{3}{16}''$ side openings 20; the probe E is closed at its end, has a lower $\frac{1}{4}''$ opening 21 and two upper $\frac{3}{16}''$ openings 22. On the drawing the location of the openings with respect to the ends of the probes and the distances between the side openings are to scale and it will be seen that their arrangement is such that a number of separate streams spaced both vertically and laterally are injected into the digestion mixture. This arrangement permits the introduction of relatively strong sulfuric acid directly into the digestion mixture without the necessity of prior dilution with recycled phosphoric acid or slurry, as has previously been the practice; for example, an acid of 75% to 95% sulfuric acid content, or stronger, can be injected through the probes A—E without danger of coating the phosphate rock particles with insoluble calcium sulfate before the $P_2O_5$ extraction is complete. In fact, experience has shown that good digestions are obtainable with such acid even when more coarsely ground phosphate rock is used than is ordinarily employed in such digestions.

The process of the invention is carried out in the above-described equipment by filling the digesters 1 and 2, along with any other digesters in the series, to a level well above the tops of the cooling coils with a slurry of ground phosphate rock in water or dilute aqueous phosphoric acid such as a mixture of product acid from the process and wash water from the calcium sulfate filters. This slurry is usually prepared by wetting out the ground rock in a mixing tank, in pebble mills or other suitable mixing equipment and the slurry may be preheated to digestion temperatures if desired. Sulfuric acid is introduced into the headers 25 and 26 and flows downwardly through the probes A—E and through the outlets or nozzles as described above. After the desired digestion temperatures are attained, which are usually within the range of about 140°–195° F., water is passed through inlet pipes 9 into the coils 6 and 7 and serves to remove the excess heat of digestion. The digestion process then proceeds with continuous introduction of additional quantities of phosphate rock slurry and sulfuric acid, preferably at rates such that 1% to 4% of free sulfuric acid is maintained in the digesters. Substantially complete digestion with extractions of 96–97.5% of the $P_2O_5$ content of the rock have been obtained in commercial practice in as little as 1 hour digestion time with uniform distribution of the incoming sulfuric acid as described above whereas with addition of all of the sulfuric acid in a single stream, which is the usual practice, extractions of only about 90–92.5% of the $P_2O_5$ required 1 hour and 52 minutes. The advantages of the invention are evident from this comparison.

After the process is operated for a time a coating of gypsum begins to form on the outer walls of the cooling coils 6 and 7. When this coating becomes so thick as to interfere with effective heat exchange the flow of cooling fluid is shut off and steam under about 40 lbs. pressure or greater is admitted to the coil through line 10. This results in heating the coils and cracking off the scale promptly and cleanly without interrupting the digestion process. By so substituting a flow of steam in the coils the scale can be cracked off at any time that the process requires, after which the flow of cooling water through the coils is resumed and the digestion process is continued without loss of time and without resorting to a period of digestion at reduced rates.

The invention will be further described and illustrated by the following specific examples.

*Example 1*

Florida pebble phosphate rock was ground with water in a ball mill to a feed mixture containing per 24 hour day 134.1 tons of $P_2O_5$, 256.1 tons of basic material, impurities and inerts and 165 tons of water including 43.8 tons of moisture in the rock. A coarse grind was used, the ground rock having the following Tyler screen analysis:

| | Percent |
|---|---|
| +60 mesh | 13.3 |
| +100 mesh | 35.5 |
| +200 mesh | 21.1 |
| −200 mesh | 30.1 |

The customary grind for this rock, as used in phosphoric acid plants wherein the digesters are fed with a single stream of sulfuric acid, is much finer, being such that 90% will pass through a 100 mesh screen and 65% will pass a 200 mesh screen.

The coarsely ground rock slurry was diluted with wash water from the calcium sulfate filter containing 180.6 tons of $P_2O_5$ and 548 tons of water. The resulting feed mixture amounting to 1283.8 tons, was fed at a uniform rate into the first two digestion tanks 1 and 2 of a three-tank digestion system along with 334 tons of 93% sulfuric acid containing 311 tons of $H_2SO_4$ and 23 tons of water. This acid was injected into the rock slurry through the probes A—E as described above. The slurry in the first digester was diluted by adding an additional 587 tons of product phosphoric acid containing 144 tons of $P_2O_5$ and 446 tons of water. Operating conditions in the digesters were as follows:

| Digester No. | Temp., °F. | Free $H_2SO_4$ | Percent Solids |
|---|---|---|---|
| 1 | 182–196 | 2.00–3.50 | 36.5 |
| 2 | 187–195 | 1.10–2.70 | 27.5 |
| 3 | 176–180 | 0.7–1.60 | 27.5 |

The slurry from the third digester in the series contained 455.7 tons of $P_2O_5$ and 398 tons of gypsum; this was fortified with returned filter cake containing 133 tons of gypsum and 44 tons of water and filtered on a horizontal filter. The filter was washed with 342 tons of water at 97° F. with recycle of the weak wash liquor to the first wash section of the filter. There was thus produced a primary filtrate containing 270 tons of $P_2O_5$ and 852 tons of water per 24 hour day of which mixture 535 tons were withdrawn as product acid. The overall yield of $P_2O_5$ recovered, based on the $P_2O_5$ content of the phosphate rock, was therefore about 96–97%.

These results were obtained with a remarkable improvement in the speed and smoothness of the digester operations. An extraction of 96–97.5% of the $P_2O_5$ from the rock in one hour digestion time was the daily routine practice. The reaction proceeded smoothly and uniformly within the digesters with the acid-distributing probes at a substantially constant temperature and requiring a substantially constant supply of acid to maintain the desired concentration of sulfate ion in solution. In tests made without using the distributing probes the acid requirement would vary as much as 50% with resulting excessive temperatures up to 210° F. This caused the formation of a voluminous type of calcium sulfate crystal which was difficult to separate from the liquor on the filter.

*Example 2*

In pilot plant scale tests on the coarsely ground rock of Example 1 a 97% extraction of $P_2O_5$ was obtained in approximately 12 minutes with uniform distribution of 93% sulfuric acid and digestion temperatures of 185°–195° F. whereas with single-point addition of the acid and poor distribution the extraction was only 82% after one hour and 40 minutes. The following table shows the effect of good and poor distribution of the sulfuric acid within the phosphate rock slurry mixtures.

| Good Distribution | | | Poor Distribution | | |
|---|---|---|---|---|---|
| Time, Min. | Ratio | Percent $H_2SO_4$ in— | Time, Min. | Ratio | Percent $H_2SO_4$ in— |
| 0–2 | | 25 | 0–1 | 1.75 | 100 |
| 4 | | 50 | 10 | 1.78 | |
| 7 | | 75 | 15 | 1.78 | |
| 12 | 1.90 | 100 | 20 | 1.79 | |
| 20 | 1.99 | | 25 | 1.82 | |
| 29 | 1.96 | | 47 | 1.83 | |
| 35 | 1.96 | | 53 | 1.82 | |
| 45 | 1.98 | | 65 | Solution boiling. | |
| | | | 100 | 1.82 | |

Samples of the slurry were titrated with standard NaOH solution to a pH of 4.55 and then to a pH of 9.60. The "Ratio" in the above tables was determined by dividing the volume of NaOH solution used in the second titration by that used in the first. It expresses the proportion:

$$\frac{\text{Weight of free } H_2SO_4 + H_3PO_4}{\text{Weight of free } H_2SO_4 + \tfrac{1}{2}H_3PO_4}$$

For example, a ratio of 1.90 indicates 2.6% of free sulfuric acid; a ratio of 1.99 indicates 1% of free sulfuric acid in the mixture.

What I claim is:

1. A method of producing phosphoric acid by digestion of ground phosphate rock with aqueous sulfuric acid in a digestion mixture of substantial size, the steps which comprise introducing sulfuric acid into the digestion mixture at a plurality of points, controlling the temperature of said digestion in the presence of cooling coils immersed therein, and having a stream of cooling fluid passing therethrough, continuing the digestion with formation of phosphoric acid and calcium sulfate until a coating of solid calcium sulfate is formed on said coils, then substituting a flow of steam in said coils for the cooling fluid therein while continuing the digestion reaction and thereby removing the calcium sulfate deposit from the coils, then resuming the flow of cooling fluid in said coils while continuing the digestion and recovering the phosphoric acid therefrom.

2. A method of digesting phosphate rock which comprises adding ground phosphate rock to a body of aqueous digestion mixture having cooling coils immersed therein while maintaining a substantially uniform distribution of sulfuric acid throughout said mixture by introducing sulfuric acid of about 75–95% $H_2SO_4$ content as a plurality of separate acid streams, said acid streams being spaced apart both vertically and laterally therein and removing heat by passing a cooling fluid through said cooling coils, continuing the digestion by addition of ground phosphate rock and sulfuric acid with formation of phosphoric acid and calcium sulfate until a coating of solid calcium sulfate has formed on said cooling coils, then substituting a flow of steam in said coils for the cooling fluid therein while continuing the digestion reaction and thereby cracking off the calcium sulfate coating from the coils, and then resuming the flow of cooling fluid through said coils while continuing the digestion.

References Cited in the file of this patent

UNITED STATES PATENTS

| | | |
|---|---|---|
| 1,003,681 | Williams | Sept. 19, 1911 |
| 1,386,809 | Taylor | Aug. 9, 1921 |
| 1,836,672 | Larsson | Dec. 15, 1931 |
| 1,894,514 | Hechenbleikner | Jan. 17, 1933 |
| 2,047,394 | Siems | July 14, 1936 |
| 2,106,223 | Nordengren | Jan. 25, 1938 |
| 2,233,956 | Moore | Mar. 4, 1941 |
| 2,375,729 | Caldwell | May 8, 1945 |
| 2,430,228 | Kirkpatrick et al. | Nov. 4, 1947 |
| 2,618,547 | Davenport et al. | Nov. 18, 1952 |

UNITED STATES PATENT OFFICE

CERTIFICATE OF CORRECTION

Patent No. 2,890,936 June 16, 1959

Curt S. Benefield

It is hereby certified that error appears in the above numbered patent requiring correction and that the said Letters Patent should read as corrected below.

In the grant, lines 1 to 3, for "Curt S. Benefield, of Roselle, New Jersey," read -- Curt S. Benefield, of Roselle, New Jersey, assignor to Chemical Construction Corporation, of New York, N. Y., a corporation of Delaware, --; line 12, for "Curt S. Benefield, his heirs" read -- Chemical Construction Corporation, its successors --; in the heading to the printed specification, line 3, for "Curt S. Benefield, Roselle, N. J." read -- Curt S. Benefield, Roselle, N. J., assignor to Chemical Construction Corporation, New York, N. Y., a corporation of Delaware --.

Signed and sealed this 10th day of November 1959.

(SEAL)

Attest:

KARL H. AXLINE
Attesting Officer

ROBERT C. WATSON
Commissioner of Patents